(12) United States Patent
Saeki et al.

(10) Patent No.: US 8,248,575 B2
(45) Date of Patent: Aug. 21, 2012

(54) PROCESS FOR PRODUCING LIQUID-CRYSTAL DISPLAY AND LIQUID-CRYSTAL PANEL BASE MATERIAL

(75) Inventors: Shinya Saeki, Kanagawa (JP); Yasuhiro Kume, Osaka (JP); Kazuhiko Tamai, Kanagawa (JP); Takaaki Okamoto, Kyoto (JP)

(73) Assignee: Sharp Kabushiki Kaisha, Osaka-Shi, Osaka (JP)

( * ) Notice: Subject to any disclaimer, the term of this patent is extended or adjusted under 35 U.S.C. 154(b) by 300 days.

(21) Appl. No.: 12/226,134

(22) PCT Filed: Apr. 3, 2007

(86) PCT No.: PCT/JP2007/057464
§ 371 (c)(1),
(2), (4) Date: Oct. 9, 2008

(87) PCT Pub. No.: WO2008/007485
PCT Pub. Date: Jan. 17, 2008

(65) Prior Publication Data
US 2009/0268129 A1    Oct. 29, 2009

(30) Foreign Application Priority Data
Jul. 11, 2006   (JP) .................................. 2006-190065

(51) Int. Cl.
*G02F 1/1339* (2006.01)
*G02F 1/1337* (2006.01)
*G02F 1/1333* (2006.01)
*G02F 1/141* (2006.01)

(52) U.S. Cl. ......... 349/190; 349/191; 349/158; 349/136
(58) Field of Classification Search ................... 349/158
See application file for complete search history.

(56) References Cited

U.S. PATENT DOCUMENTS

| | | | |
|---|---|---|---|
| 6,642,992 B2 * | 11/2003 | Kim .............................. | 349/191 |
| 6,977,704 B2 | 12/2005 | Kataoka et al. | |
| 7,359,028 B2 | 4/2008 | Makimoto et al. | |
| 2003/0063249 A1 * | 4/2003 | Hoshino et al. ............... | 349/149 |
| 2004/0233374 A1 * | 11/2004 | Yamazaki et al. ............ | 349/153 |
| 2005/0146664 A1 | 7/2005 | Hanaoka et al. | |
| 2005/0200800 A1 | 9/2005 | Makimoto et al. | |

FOREIGN PATENT DOCUMENTS

| | | |
|---|---|---|
| JP | 7-301787 A | 11/1995 |
| JP | 9-281515 A | 10/1997 |
| JP | 10-253972 A | 9/1998 |
| JP | 2002-357830 A | 12/2002 |
| JP | 2005-258074 A | 9/2005 |

* cited by examiner

*Primary Examiner* — Wen-Ying P Chen
(74) *Attorney, Agent, or Firm* — Birch, Stewart, Kolasch & Birch, LLP

(57) ABSTRACT

A method includes for manufacturing a liquid crystal display device includes: a sealant supplying step of supplying an uncured sealant to a first substrate or a second substrate; a dropping step of dropping a liquid mixture of a liquid crystal material and an additive to a region inside the sealant; a bonding step of bonding the first substrate and the second substrate with the sealant and the liquid mixture interposed therebetween to form a bonded substrate; and a curing step of applying the predetermined curing conditions with a voltage being applied to a terminal portion, and thereby curing the sealant and altering the additive to give a pretilt angle to liquid crystal molecules.

4 Claims, 7 Drawing Sheets

PROCESS FOR PRODUCING LIQUID-CRYSTAL DISPLAY AND LIQUID-CRYSTAL PANEL BASE MATERIAL

BACKGROUND OF THE INVENTION

1. Field of the Invention

The invention relates to a manufacturing method of a liquid crystal display device and a liquid crystal panel base material.

2. Description of the Related Art

TN (Twist Nematic) mode liquid crystal display devices in which a liquid crystal material having positive dielectric anisotropy is oriented so as to be parallel to a substrate plane and be twisted by 90 degrees between opposing substrates have been widely used as active matrix type liquid crystal display devices. The TN mode liquid crystal display devices, however, have relatively poor viewing-angle characteristics, and various methods have therefore been developed in order to improve the viewing-angle characteristics.

For example, so-called ASV (Advanced Super View) mode liquid crystal display devices have been developed as a method for improving viewing-angle characteristics. In the ASV-mode liquid crystal display devices, a liquid crystal material having negative dielectric anisotropy is oriented perpendicular to a substrate plane, and the viewing-angle characteristics are improved by using rivets and electrode slits and the like formed in the inner surfaces of the substrates.

The ASV mode can improve the viewing-angle characteristics of liquid crystal display devices. In this mode, however, response of liquid crystal molecules is obtained by an oblique electric field effect provided by the rivets and the electrode slits. The liquid crystal molecules near the substrate surfaces, rivets, and electrode slits therefore have a high response speed, while the other liquid crystal molecules, especially those located in an intermediate part of a liquid crystal layer, have a low response speed. The reason for this is as follows: since an alignment film is formed on the substrate surfaces, rivets, and electrode slits, an excellent pretilt angle is applied to the liquid crystal molecules near the substrate surfaces, rivets, and electrode slits by the alignment film. However, an excellent pretilt angle is not applied to the liquid crystal molecules located away from the alignment film. It is therefore difficult to sufficiently increase the response speed of the liquid crystal molecules in moving image display, and technology for improving the response speed of liquid crystal molecules has been demanded.

A method using polymer stabilization technology has been proposed as technology of improving the response speed in the ASV mode. In the polymer stabilization technology, a mixture of liquid crystal and a monomer as an additive is injected between substrates, and the monomer is polymerized and altered with liquid crystal molecules oriented to a predetermined direction. A polymer that adsorbs the liquid crystal molecules is thus produced. An excellent pretilt angle can be applied to the liquid crystal molecules in the whole liquid crystal layer by adsorptive power of this polymer. Orientation regulation force to the liquid crystal molecules can thus be improved, whereby the response speed of a liquid crystal display device can be improved.

Technology using such polymer stabilization technology is disclosed in, for example, Patent document 1. A liquid crystal display device disclosed in Patent document 1 has, in a liquid crystal layer, a hardened material (polymer) having a liquid crystal framework that tilts liquid crystal molecules. An excellent pretilt angle can be given to the liquid crystal molecules by adsorptive power of the liquid crystal framework. As a result, response characteristics of the liquid crystal molecules to voltage application can be improved.

When this liquid crystal display device is manufactured, a bonded substrate is first divided into individual cells, whereby individual liquid crystal panels are obtained. Next, a liquid crystal material and a photopolymerizable resin material are injected into each liquid crystal panel. A voltage is then applied to the liquid crystal panel to orient liquid crystal molecules to a predetermined direction. In this state, ultraviolet (UV) rays are emitted to the liquid crystal panel to polymerize the photopolymerizable resin.

In a conventional liquid crystal panel fabrication process, on the other hand, a first substrate that is a collection of TFT substrates and a second substrate that is a collection of counter substrates are bonded to each other to form a bonded substrate. The bonded substrate is then separated into individual liquid crystal panels by a dividing process or the like, and a liquid crystal material is injected into each liquid crystal panel. However, a liquid crystal dropping/bonding process has been proposed and used in practical applications in order to improve productivity and to reduce loss of a liquid crystal material.

In a commonly used liquid crystal dropping/bonding process, a sealant is drawn on one of a first substrate and a second substrate, and liquid crystal is dropped. The sealant is then cured by emitting UV rays, whereby the first substrate and the second substrate are bonded to each other.

When a liquid crystal panel is manufactured by using a liquid crystal dropping/bonding process and polymer stabilization technology, a sealant is first drawn on a first substrate or a second substrate. A liquid mixture of a liquid crystal material and a photopolymerizable resin material is then dropped onto the substrate having the sealant drawn thereon, and the first substrate and the second substrate are bonded to each other to form a bonded substrate. The sealant is then cured by emitting UV rays to the bonded substrate. Thereafter, the bonded substrate is separated into individual liquid crystal panels by dividing the bonded structure. Liquid crystal molecules are oriented to a predetermined direction by applying a voltage to each of the divided individual liquid crystal panels, and the photopolymerizable resin material in the liquid crystal layer is polymerized and altered by emitting UV rays.

Patent document 1: Japanese Laid-Open Patent Publication No. 2002-357830

SUMMARY OF THE INVENTION

Problems to be Solved by the Invention

In this case, however, the process of curing the sealant is performed before the process of polymerizing the photopolymerizable resin material in the liquid crystal layer. Since the process of curing the sealant is performed by emitting infrared rays, the sealant is cured as well as polymerization of the photopolymerizable resin material in the liquid crystal layer is facilitated by this process. In other words, polymerization of the photopolymerizable resin material in the liquid crystal layer is facilitated in the state where no voltage is applied to the liquid crystal panel, that is, in the state where the liquid crystal molecules are not oriented to a predetermined direction (pretilt direction). As a result, an excellent orientation state of the liquid crystal molecules cannot be obtained, hindering accurate orientation control of the liquid crystal molecules.

The invention is made in view of the above problems and it is an object of the invention to improve display quality of a moving image by enabling a pretilt angle to be reliably given to liquid crystal molecules in the whole liquid crystal layer even when a sealant is cured in a liquid crystal dropping/bonding process.

Means for Solving the Problems

In order to achieve the above object, according to the invention, curing of a sealant and alteration of an additive that is performed with liquid crystal molecules oriented to a predetermined direction are performed in the same step.

More specifically, a method for manufacturing a liquid crystal display device according to the invention is a method for manufacturing a liquid crystal display device including an approximately frame-shaped sealant sealing a liquid crystal layer between a first substrate and a second substrate facing the first substrate and cured under predetermined curing conditions, and a terminal portion formed on the first substrate and connected to an electrode layer for controlling orientation of liquid crystal molecules in the liquid crystal layer. This method includes: a sealant supplying step of supplying the sealant in an uncured state to the first substrate or the second substrate so that the supplied sealant has an approximately frame shape; a dropping step of dropping a liquid mixture of a liquid crystal material and an additive to a region inside the sealant; a bonding step of bonding the first substrate and the second substrate with the sealant and the liquid mixture interposed therebetween to form a bonded substrate; and a curing step of subjecting the bonded substrate to the predetermined curing conditions with a voltage being applied to the terminal portion, and thereby curing the sealant and altering the additive to give a pretilt angle to the liquid crystal molecules.

The method may further include a dividing step for dividing the bonded substrate, and a plurality of liquid crystal display devices may be manufactured from the bonded substrate.

Desirably, the curing step is performed before the dividing step.

Preferably, the additive is a photopolymerizable resin that is polymerized when light energy is applied thereto.

Preferably, the additive is altered by emitting ultraviolet rays to the bonded substrate under the predetermined curing conditions.

Desirably, the second substrate has an opening formed in a region that faces the terminal portion of the first substrate.

Desirably, the terminal portion is extended from the electrode layer to a peripheral region of the first substrate, and in the bonding step, the first substrate and the second substrate are bonded to each other with the terminal portion being exposed without being covered by the second substrate.

A liquid crystal panel base material according to the invention is a liquid crystal panel base member having a plurality of liquid crystal panels integrally arranged in a matrix pattern. The liquid crystal panel base member includes: a first substrate; a second substrate facing the first substrate; a plurality of liquid crystal layers surrounded and sealed by a sealant between the first substrate and the second substrate in each of the liquid crystal panels; a plurality of electrode layers provided on the liquid crystal layer side of the first substrate for controlling an orientation state of liquid crystal molecules in the liquid crystal layers; and a terminal portion formed on the first substrate and connected to the electrode layers, wherein at least a part of the terminal portion is exposed without being covered by the second substrate, and a polymer for giving a pretilt angle to the liquid crystal molecules is included in the liquid crystal layers.

Preferably, the second substrate has an opening formed in a region facing the terminal portion of the first substrate.

Preferably, the terminal portion is extended from the electrode layers to a peripheral region of the first substrate.

Preferably, the polymer is formed by polymerizing a photopolymerizable resin.

[Functions]

Functions of the invention will now be described.

In a sealant supplying step, a sealant that is cured under predetermined curing conditions is supplied in an uncured state to a predetermined region of a first substrate or a second substrate so that the supplied sealant has an approximately frame shape. Next, in a dropping step, a liquid mixture of a liquid crystal material and an additive that is altered under the same conditions as the predetermined curing conditions is dropped by a predetermined amount to a region inside the sealant. Thereafter, in a bonding step, the first substrate and the second substrate are bonded to each other to form a bonded substrate.

Next, in a curing step, a voltage is first applied to a terminal portion of the first substrate, whereby liquid crystal molecules in a liquid crystal layer are oriented to a predetermined direction. In this state, predetermined curing conditions are then applied. As a result, the sealant is cured and the additive in the liquid crystal layer is altered to give a pretilt angle to the liquid crystal molecules. In other words, curing of the sealant and alteration of the additive are carried out in the same step. A liquid crystal panel base material, which is a base material of liquid crystal display devices, is thus formed by the steps described above.

Next, in the dividing step, the liquid crystal panel base material is divided into individual cells, whereby the liquid crystal panel base material is separated into a plurality of individual liquid crystal panels. A liquid crystal display device in which the liquid crystal molecules in the whole liquid crystal layer sealed by the cured sealant have an excellent orientation state is thus manufactured by the steps described above.

When the bonded substrate is formed by the bonding step, the terminal portion formed on the first substrate is exposed without being covered by the second substrate. This structure enables a voltage to be applied to the terminal portion before the dividing step of dividing the bonding substrate. Preferably, the terminal portion is exposed without being covered by the second substrate by using, for example, a second substrate having an opening formed in a region facing the terminal portion of the first substrate when the first substrate and the second substrate are bonded to each other. Preferably, in an alternative example, the terminal portion is exposed without being covered by the second substrate by using, for example, a first substrate having a terminal portion extended from the electrode layer to a peripheral region of the first substrate.

This structure enables a voltage to be applied to the terminal portion before the dividing step is performed to the bonding substrate. In other words, a voltage can be applied to the terminal portion before curing of the sealant is performed. As a result, the sealant can be cured as well as the additive in the liquid crystal layer can be altered by applying predetermined curing conditions, for example, by emitting UV rays, with a voltage being applied to the terminal portion, that is, with the liquid crystal molecules being oriented to a predetermine direction. The additive in the liquid crystal layer can therefore be prevented from being altered in the state where the liquid crystal molecules are not oriented to the predetermined direction, and a pretilt angle can be given to the liquid crystal molecules in the whole liquid crystal layer.

Since a voltage can be applied to the terminal portion before the dividing step, it is not necessary to apply a voltage to each of individual liquid crystal panels obtained by the dividing step. As a result, manufacturing cost can be reduced.

Effects of the Invention

According to the invention, a sealant is cured as well as an additive is altered by applying predetermined curing conditions with a voltage being applied to a terminal portion, that is, with liquid crystal molecules in a liquid crystal layer being oriented to a predetermined direction (pretilt direction). The additive can therefore be prevented from being altered in the state where the liquid crystal molecules are not oriented to the predetermined direction, and an excellent pretilt angle can be given to the liquid crystal molecules in the whole liquid crystal layer. As a result, response characteristics of the liquid crystal molecules can be improved, whereby display quality of a moving image can be improved.

DESCRIPTION OF THE REFERENCE NUMERALS

Figure 1:
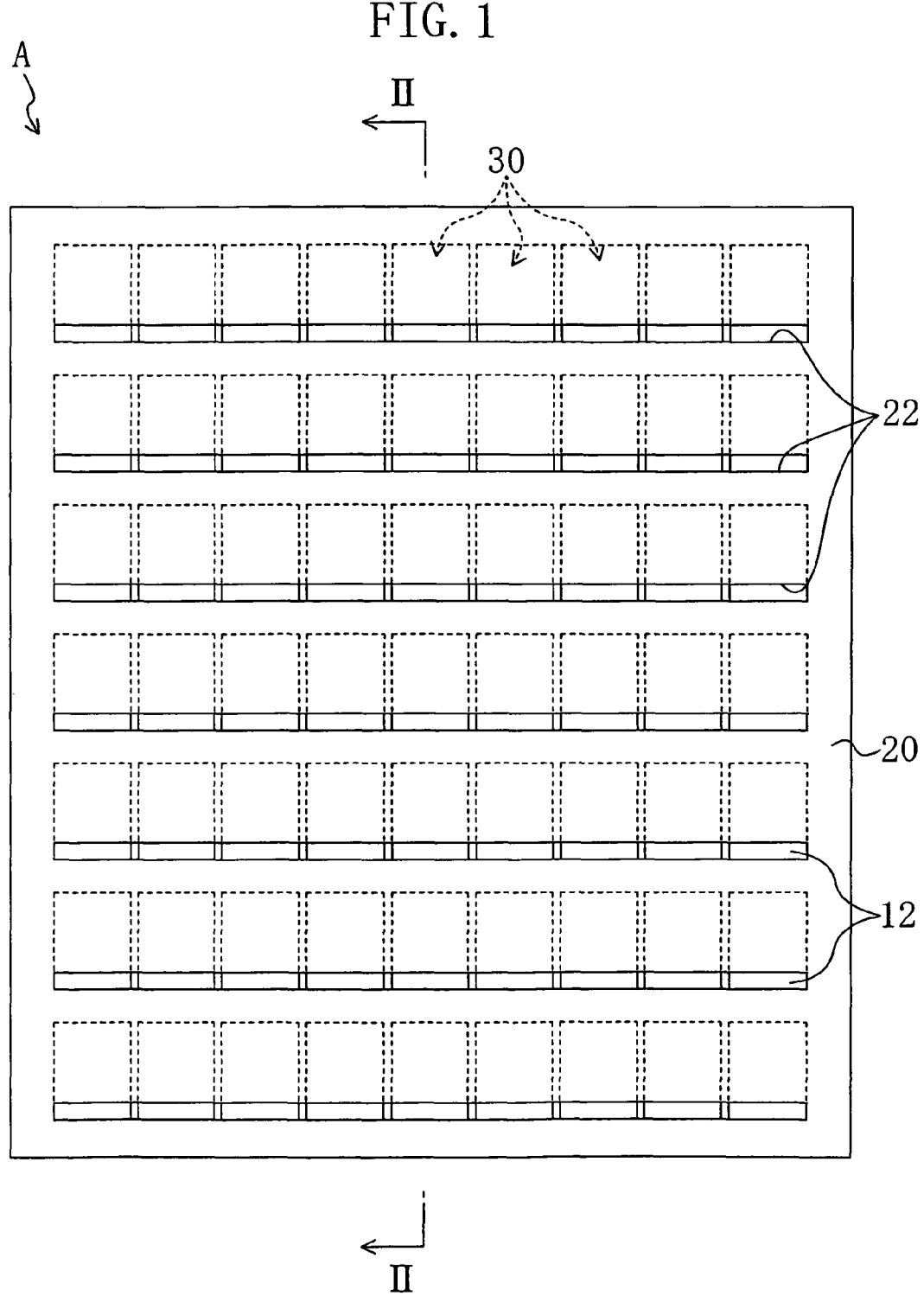
FIG. 1 is a front view of a liquid crystal panel base material according to a first embodiment.

S liquid crystal display device
10 first substrate
12 TFT terminal portion (terminal portion)
15 liquid crystal layer
16 sealant
17 first electrode layer (electrode layer)
20 second substrate
22 opening

DETAILED DESCRIPTION OF THE INVENTION

Hereinafter, embodiments of the invention will be described in detail with reference to the accompanying drawings. Note that the invention is not limited to the embodiments described below.

First Embodiment

Figure 2:
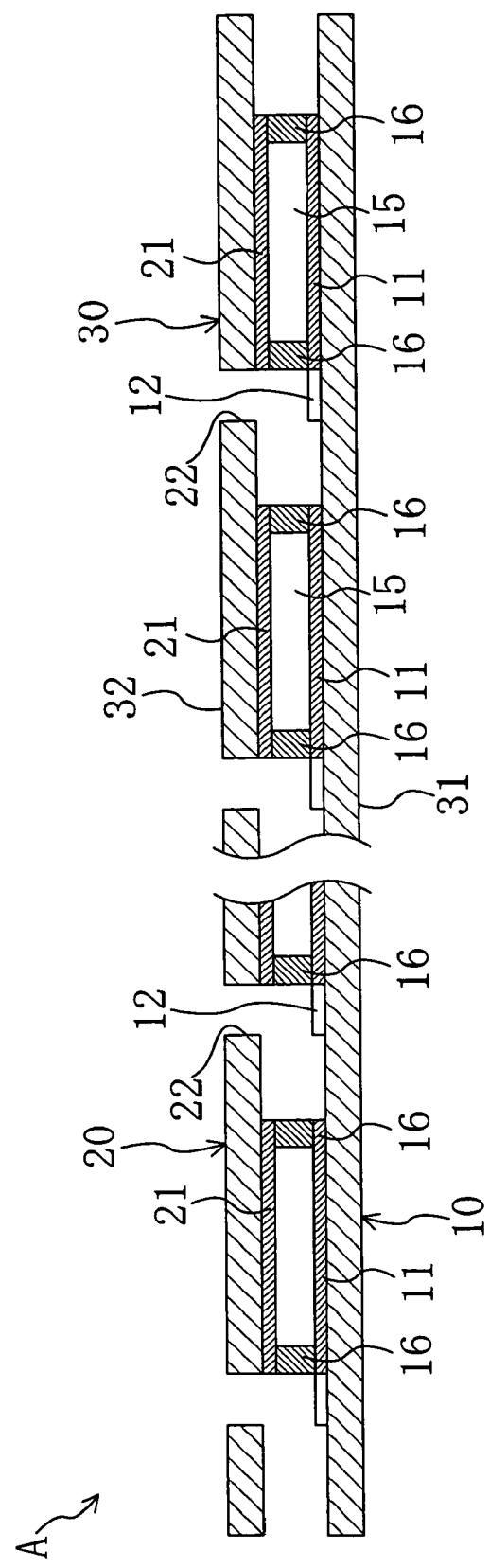
FIG. 2 is a cross-sectional view schematically showing a main part taken along line II-II in FIG. 1.
Figure 3:
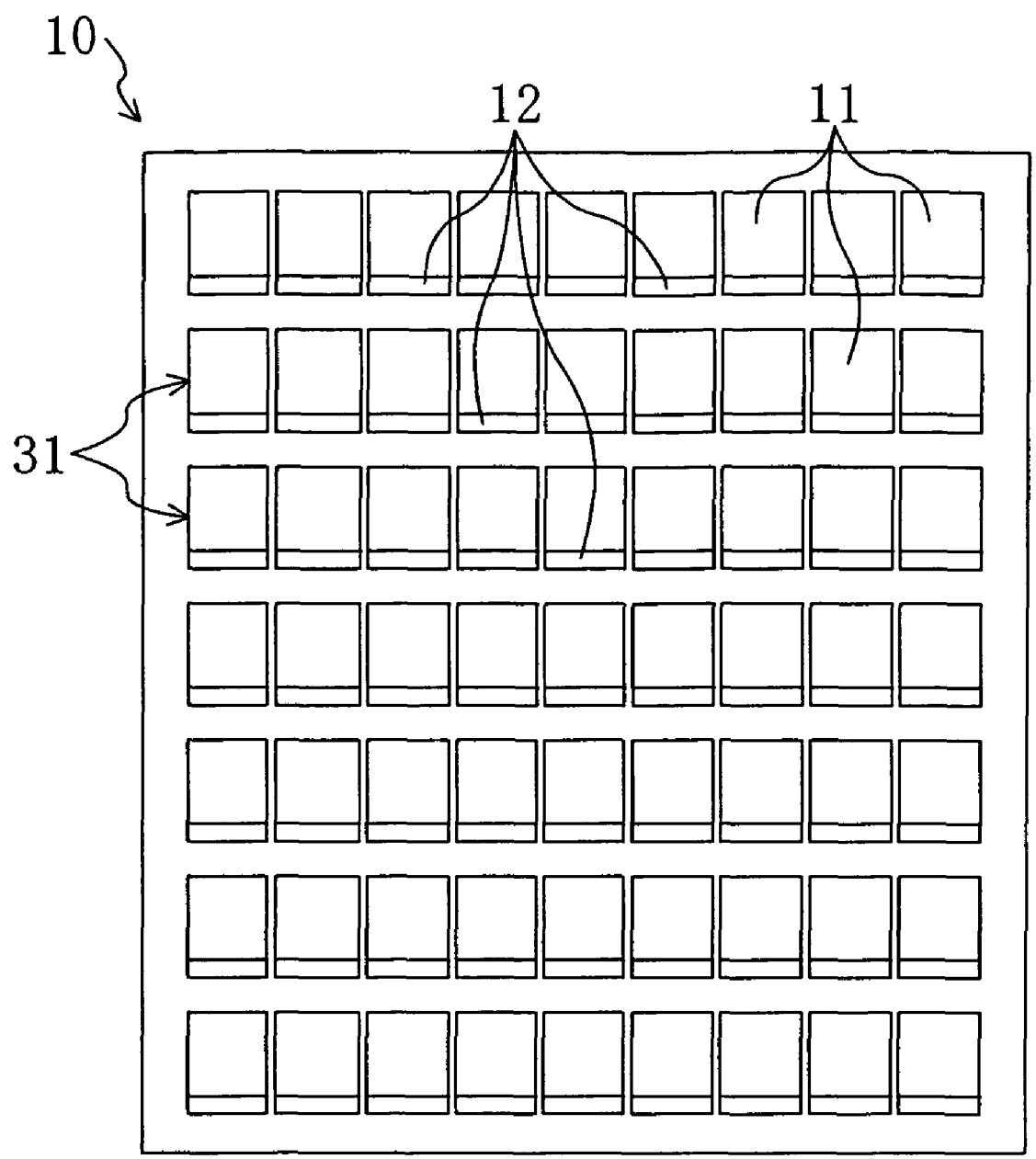
FIG. 3 is a diagram showing a first substrate of the liquid crystal panel base material according to the first embodiment.
Figure 4:
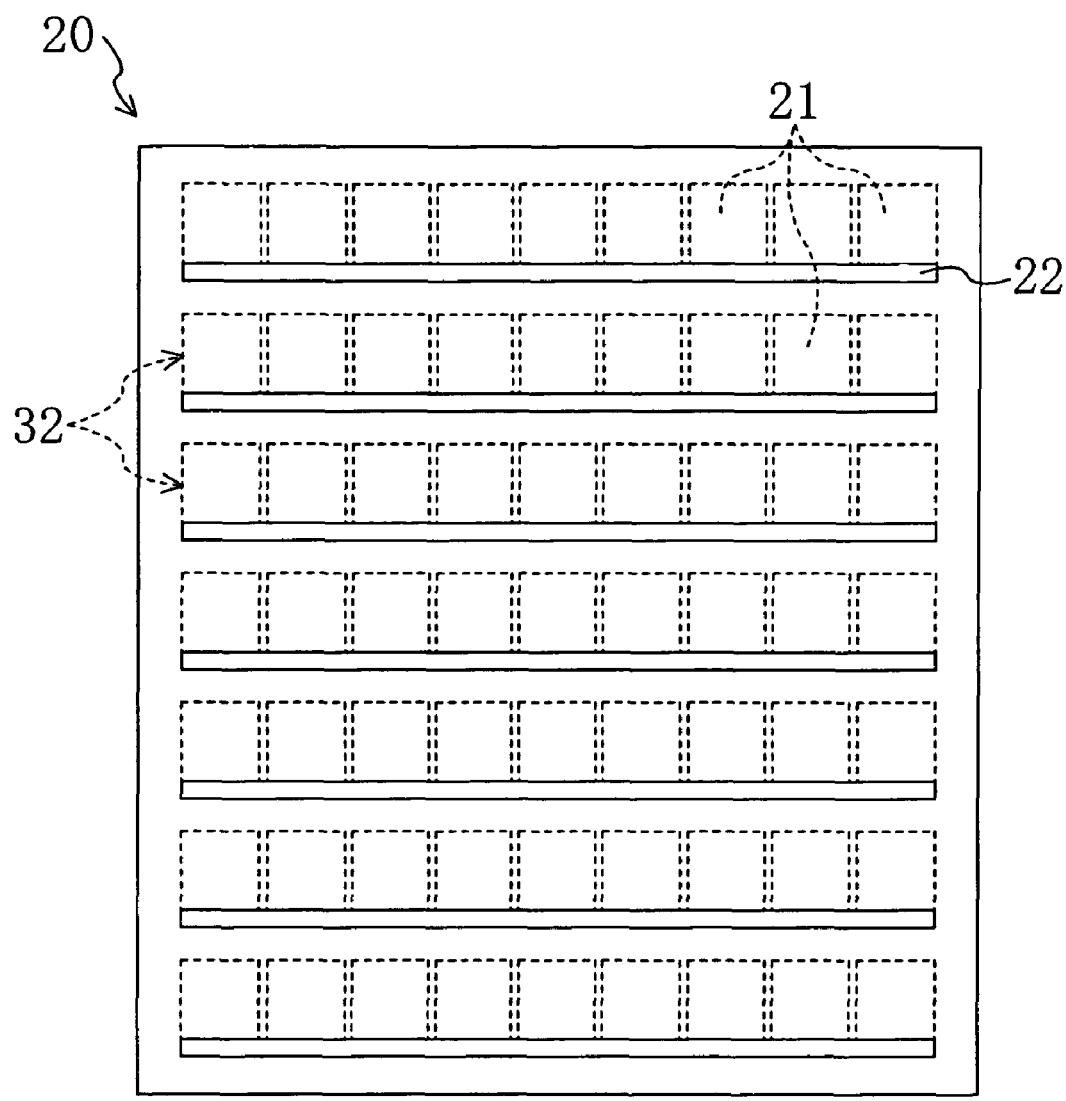
FIG. 4 is a diagram showing a second substrate of the liquid crystal panel base material according to the first embodiment.
Figure 8:
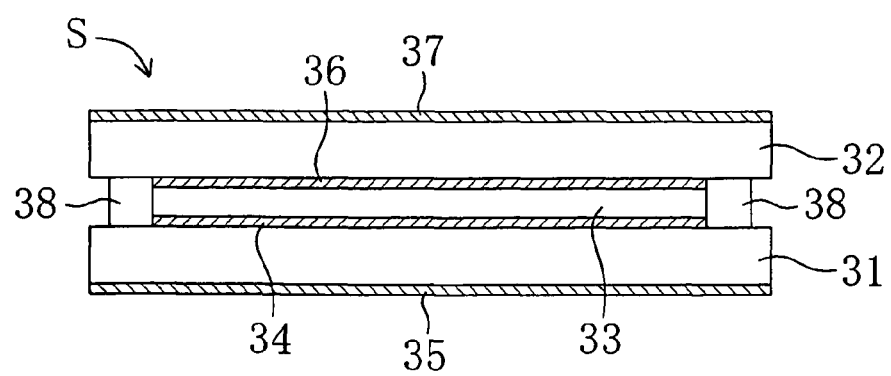
FIG. 8 is a diagram schematically showing a main part of a liquid crystal display device.

FIGS. 1 through 4 and FIG. 8 show a liquid crystal panel base material A which is a bonded substrate according to a first embodiment of the invention. FIG. 1 is a front view of the liquid crystal panel base material A according to this embodiment. FIG. 2 is a cross-sectional view schematically showing the liquid crystal panel base material A shown in FIG. 1. FIG. 3 is a front view of a first substrate 10 of the liquid crystal panel base material A according to this embodiment. FIG. 4 is a front view of a second substrate 20 of the liquid crystal panel base material A according to this embodiment. FIG. 8 is a schematic cross-sectional view of a liquid crystal display device S.

The liquid crystal panel base material A shown in FIGS. 1 and 2 is a base material of liquid crystal display devices S, in which a plurality of liquid crystal panels are integrally arranged in a matrix pattern. In other words, the liquid crystal display devices S are manufactured by dividing the liquid crystal panel base material A into individual liquid crystal panels.

As shown in FIG. 8, a liquid crystal display device S includes a TFT substrate 31, a counter substrate 32 provided so as to face the TFT substrate 31, and a liquid crystal layer 33 formed between the substrates 31, 32.

The TFT substrate 31 has a plurality of pixels and a plurality of TFTs (Thin Film Transistors) respectively corresponding to the pixels (not shown). Moreover, the TFT substrate 31 has an alignment film 34 formed on the surface on the liquid crystal layer 33 side and a polarizing plate 35 laminated on the opposite surface to the liquid crystal layer 33. A driver portion for controlling driving of each TFT and a terminal portion for applying a voltage to each TFT are mounted on the TFT substrate 31 (not shown).

Although not shown in the figure, a color filter, a common electrode made of ITO (transparent electrode), and the like are formed on the counter substrate 32. The counter substrate 32 has an alignment film 36 formed on the surface on the liquid crystal layer 33 side and a polarizing plate 37 laminated on the opposite surface to the liquid crystal layer 33. The liquid crystal layer 33 is sealed by a sealant 38 interposed between the TFT substrate 31 and the counter substrate 32. The liquid crystal display device S thus provides desired display by controlling an orientation state of liquid crystal molecules in the liquid crystal layer 33 by the TFTs.

As shown in FIGS. 1 and 2, the liquid crystal panel base material A, which is a base material of such a liquid crystal display device S, is formed by bonding a first substrate 10 that is a collection of TFT substrates 31 and a second substrate 20 that is a collection of counter substrates 32 to each other so that the first substrate 10 and the second substrate 20 face each other. The first substrate 10 and the second substrate 20 of the liquid crystal panel base material A according to this embodiment will now be described. Note that, in this specification, as shown in FIG. 3, a region where a first electrode layer 11 and a TFT terminal portion 12 are formed on the first substrate 10 is also referred to as a TFT substrate 31 for convenience. As shown in FIG. 4, a region where a second electrode layer 21 is formed on the second substrate 20 is herein also referred to as a counter substrate 32 for convenience.

As shown in FIG. 3, the first substrate 10 has a plurality of rectangular TFT substrates 31 arranged at predetermined intervals in a matrix pattern. A first electrode 11 that is an electrode layer for controlling an orientation state of liquid crystal molecules and a TFT terminal portion 12 that is a terminal portion for applying a voltage to the first electrode layer 11 are formed on each TFT substrate 31. The first electrode layer 11 and the TFT terminal portion 12 are provided adjacent to each other and are connected to each other. The first electrode layer 11 includes pixel electrodes for controlling orientation of liquid crystal molecules in a liquid crystal layer 15, TFT's, wirings for connecting the pixel electrodes and the TFTs, and the like. The positional relation between the first electrode layer 11 and the TFT terminal portion 12 in the TFT substrate 31 is the same in all the TFT substrates 31.

As shown in FIG. 4, the second substrate 20 has a plurality of rectangular counter substrates 32 arranged at predetermined intervals in a matrix pattern. A second electrode layer 21 for controlling orientation of liquid crystal molecules together with the first electrode layer 11 is formed in each counter substrate 20. The second electrode layer 21 includes ITO (transparent electrode). The second electrode layer 21 is approximately the same in size as the first electrode layer 11. Each second electrode layer 21 is formed as a pair with a corresponding first electrode layer 11 so that the first electrode layer 11 is located in a region facing the second electrode layer 21 when the first substrate 10 and the second substrate 20 are bonded to each other.

The second substrate 20 has a plurality of openings 22. The openings 22 are formed so as to include a region facing the TFT terminal portions 12. As shown in FIG. 1, a plurality of TFT terminal portions 12 arranged in a line in a left-right direction faces one opening 22 extending in the direction in which the TFT terminal portions 12 are arranged. When the first substrate 10 and the second substrate 20 are bonded to each other, the first electrode layers 11 and the second electrode layers 21 face each other, respectively, and the TFT terminal portions 12 located adjacent to each other in the left-right direction are exposed from each opening 22 without being covered by the second substrate 20. In other words, as shown in FIGS. 1 and 2, a voltage can be applied to the exposed TFT terminal portions 12.

The TFT substrate 31 and the counter substrate 32 face each other to form a liquid crystal panel. The liquid crystal layer 15 is formed between the first electrode layer 11 and the second electrode layer 12. In addition to a liquid crystal material, a polymer is included in the liquid crystal layer 15. This polymer has such adsorptive power that tilts liquid crystal molecules to give a pretilt angle to liquid crystal molecules. Moreover, this polymer is formed by, for example, polymerizing an additive such as an ultraviolet (UV)-polymerizable resin by emitting UV rays thereto.

The liquid crystal layer 15 is sealed in each liquid crystal panel by a sealant 16 interposed between the first substrate 10 and the second substrate 20. The sealant 16 is formed by, for example, curing a UV-curable resin by emitting UV rays thereto. Glass fibers having a uniform thickness are included in the sealant 16 in order to keep the thickness of the sealant 16 constant. Although not shown in the figure, the first substrate 10 and the second substrate 20 have an alignment film formed on the surface on the liquid crystal layer 15 side. The first substrate 10 having the plurality of first electrode layers 11 and the second substrate 20 having the plurality of second electrode layers 21 thus face each other with the sealant 16 and the liquid crystal layer 15 interposed therebetween, whereby a plurality of cells 30 each forming a liquid crystal display device S are formed. Between adjacent cells 30, a predetermined gap is formed between the first substrate 10 and the second substrate 20. The liquid crystal panel base material A thus enables liquid crystal molecules in the liquid crystal layer 15 to be oriented to a predetermined direction by applying a voltage to the TFT terminal portions 12 exposed through the second substrate 20.

[Manufacturing Method]

First, a manufacturing method of the first substrate 10 and the second substrate 20 will be described.

A manufacturing method of the first substrate 10 includes a first electrode formation step, a cleaning step, and an alignment film formation step.

First, in the first electrode layer formation step, TFTs and first electrode layers 11 connected to the TFTs are formed on a glass substrate by using photolithography or the like. Next, in the cleaning step, the glass substrate is cleaned to remove particles and impurities on the substrate. The cleaning step is performed by using, for example, pure water, ultrasonic waves, UV irradiation, and the like. Thereafter, in the alignment film formation step, an alignment film for orienting liquid crystal molecules to a predetermined direction is formed over the surface of the glass substrate. The alignment film is made of, for example, a polyamide resin or the like. The first substrate 10 is thus manufactured.

A manufacturing method of the second substrate 20 includes a filter formation step, a second electrode formation step, an alignment film formation step, and an opening formation step.

First, in the filter formation step, a color filter is patterned on a glass substrate by, for example, a staining method, a photolithography method, or the like. Next, in the second electrode formation step, second electrode layers 21 are formed on the glass substrate so as to respectively correspond to the first electrode layers 11 in a region facing the first electrode layers 11. Next, in the alignment film formation step, an alignment film for orienting liquid crystal molecules to a predetermined direction is formed over the glass substrate. Thereafter, in the opening formation step, openings 22 are formed in the glass substrate by using a glass cutter or the like. The openings 22 are formed so that each opening 22 includes a region that faces a plurality of TFT terminal portions 12 arranged in a line in a left-right direction when the first substrate 10 and the second substrate 20 face each other. The second substrate 20 is thus manufactured.

A manufacturing method of a liquid crystal display device S formed by the first substrate 10 and the second substrate 20 will now be described. A manufacturing method of the liquid crystal display device S includes a sealant supplying step, a dropping step, a bonding step, a curing step, and a dividing step.

First, in the sealant supplying step, an uncured sealant 16 is supplied approximately in a frame shape by, for example, screen printing or the like on the surface of the first substrate 10 or the second substrate 20 on which the alignment film is formed. A region to which the sealant 16 is to be supplied is an approximately frame-shaped region in the range of approximately 1 mm to 2 mm from the outer periphery of the first electrode layer 11 or the second electrode layer 21.

Next, in the dropping step, a predetermined amount of a liquid mixture of a liquid crystal material and a UV-polymerizable resin material is dropped to a region located inside the sealant 16 supplied in the sealant supplying step. This dropping of the liquid mixture is performed by, for example, dropping the liquid mixture while a dropping device having a function to drop a liquid mixture moves over the entire substrate. This dropping device includes, for example, a cylinder filled with a liquid mixture, a piston for ejecting the liquid mixture contained in the cylinder, and a dropping nozzle formed at the tip of the cylinder. The dropping device ejects the liquid mixture contained in the cylinder by the piston and drops the liquid mixture from the dropping nozzle.

Thereafter, in the bonding step, a bonded substrate is formed by bonding the first substrate 10 and the second substrate 20 to each other with the sealant 16 and the liquid crystal layer 15 interposed therebetween. First, the first substrate 10 and the second substrate 20 are arranged so that their respective surfaces having the alignment film formed thereon face each other. Next, the first substrate 10 and the second substrate 20 are aligned with respect to each other by using an alignment mark for positional alignment provided in advance at opposing corners of both substrates. First, rough alignment is performed in a noncontact state. The first substrate 10 and the second substrate 20 are then bonded to each other by performing fine alignment with the opposing surfaces of both substrates being almost in contact with each other. This bonding step is performed in a vacuum environment, for example, in a vacuum chamber. At this time, the TFT terminal portions 12 provided on the first substrate 10 face the openings 22 formed on the second substrate. In other words, by this step, the TFT terminal portions 12 are exposed through the openings 22 without being covered by the second substrate 20.

Next, in the curing step, the bonded substrate is subjected to predetermined curing conditions while applying a voltage to the TFT terminal portions 12 in order to cure the sealant 16 and polymerize the UV-polymerizable resin material and thereby give a pretilt angle to liquid crystal molecules. First, a voltage is applied to each TFT terminal portion 12 exposed from the openings 22 of the bonded substrate by using an electric apparatus such as a plug. The liquid crystal molecules in the liquid crystal layer 15 are thus oriented to a predetermined direction. In this state, UV rays are emitted to the bonded substrate. As a result, the sealant 16 made of a UV-curable resin is cured, and the UV-polymerizable resin material in the liquid crystal layer 15 is polymerized to give a pretilt angle to the liquid crystal molecules. The liquid crystal panel base material A, which is a base material of the liquid crystal display device S, is manufactured by the steps described above.

Next, in the dividing step, the liquid crystal panel base material A is separated into a plurality of individual liquid crystal panels by performing processing such as a dividing process to the liquid crystal panel base material A. First, a scribe line, which is a crack formed in a direction perpendicular to a substrate surface of the liquid crystal panel base material A, is formed by using a glass cutter. The scribe line is formed along the boundary of each individual liquid crystal panel which separates individual liquid crystal panels from each other. Dividing of the liquid crystal panel base material A is then performed by locally applying a pressure along the scribe line. The liquid crystal panel base material A is thus separated into a plurality of individual liquid crystal panels. A plurality of liquid crystal display devices S are thus manufactured by the steps described above.

Effects of First Embodiment

As described above, according to the first embodiment, the first substrate 10 and the second substrate 20 having the openings 22 formed in the region facing the TFT terminal portions 12 are bonded to each other in the bonding step. The TFT terminal portions 12 thus face the openings 22. In other words, the TFT terminal portions 12 are exposed from the openings 22 without being covered by the second substrate 20. A voltage can therefore be applied to the exposed TFT terminal portions 12. Accordingly, in the curing step, the sealant 16 can be cured as well as the UV-polymerizable resin material in the liquid crystal layer 15 can be polymerized and altered by emitting UV rays to the bonded substrate in the state where the liquid crystal molecules are oriented to a predetermined direction by voltage application to the TFT terminal portions 12. Polymerization of the UV-polymerizable resin material in the liquid crystal layer 15 can therefore be prevented from being facilitated in the state where the liquid crystal molecules are not oriented to a predetermined direction, and a pretilt angle can be given to the liquid crystal molecules in the whole liquid crystal layer 15. The liquid crystal molecules in the whole liquid crystal layer 15 can therefore be brought into an excellent orientation state. As a result, response characteristics of the liquid crystal molecules can be improved and display quality of a moving image can be improved.

Moreover, a voltage can be applied to the TFT terminal portions 12 exposed through the openings 22 of the bonded substrate obtained in the bonding step. A voltage can therefore be applied to the TFT terminal portions 12 before the dividing step. Accordingly, it is not necessary to apply a voltage to the individual liquid crystal panels obtained by dividing the bonded substrate into individual cells. As a result, manufacturing cost can be reduced.

Second Embodiment

Figure 5:
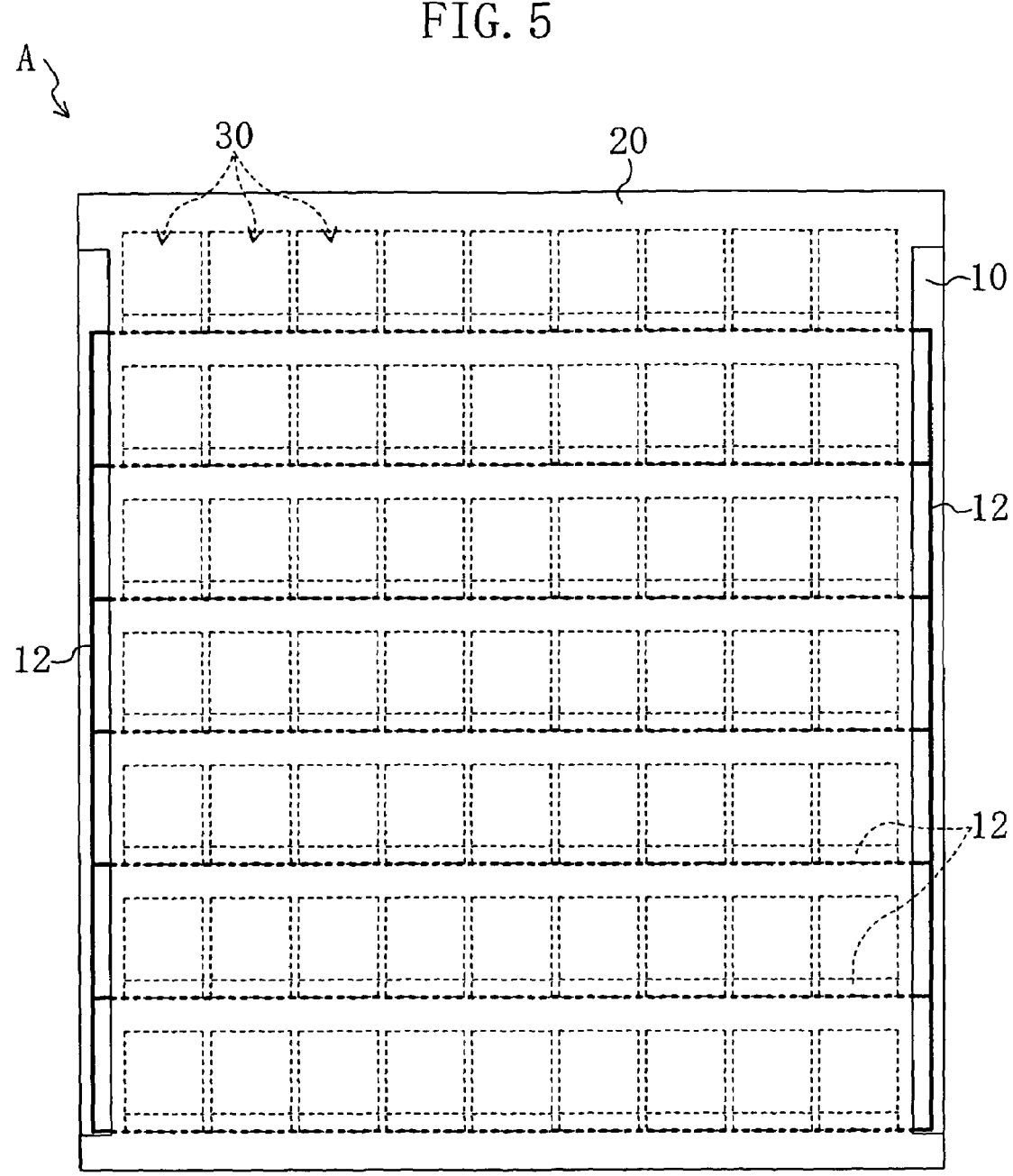
FIG. 5 is a front view of a liquid crystal panel base material according to a second embodiment.
Figure 6:
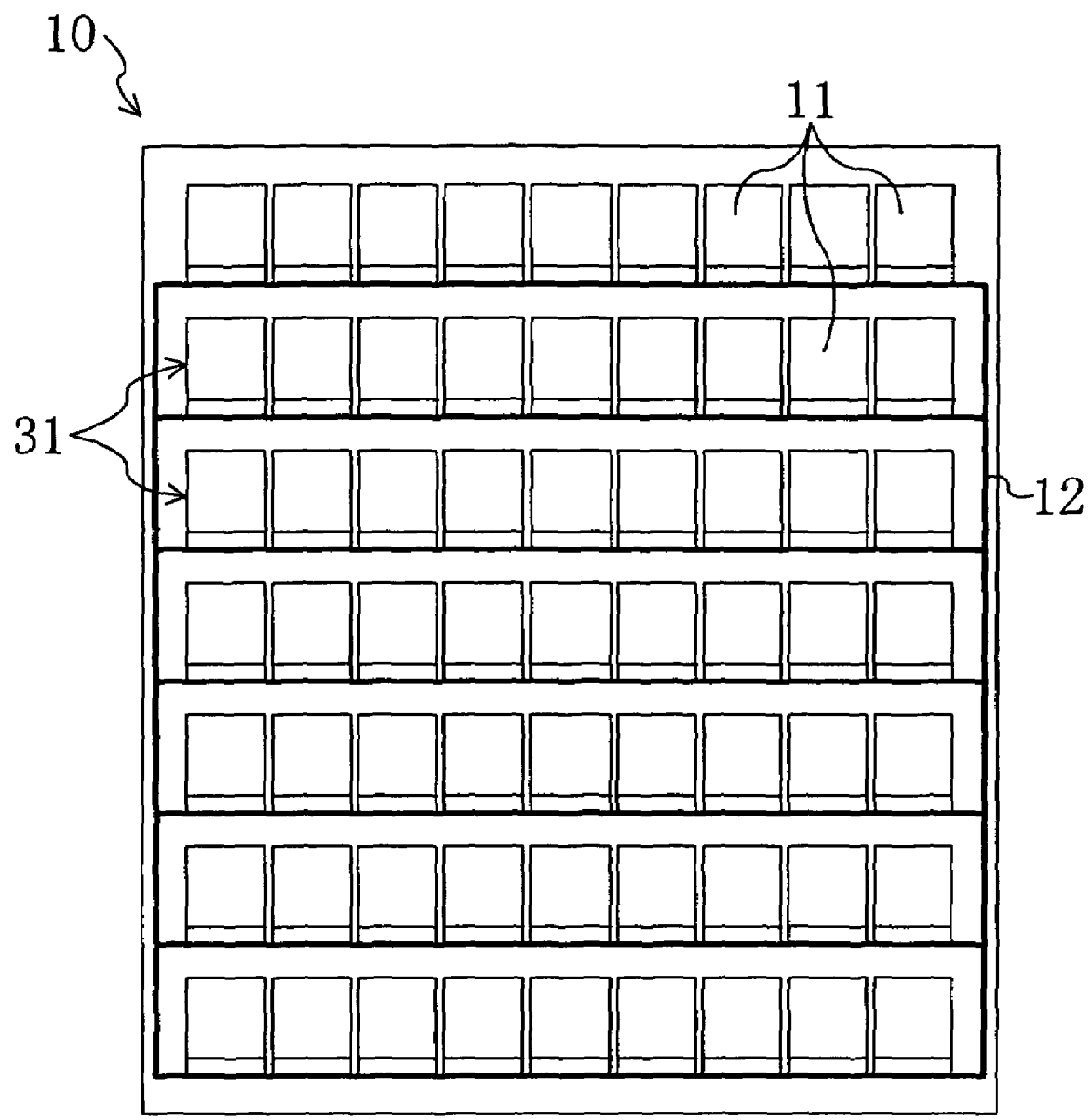
FIG. 6 is a diagram showing a first substrate of the liquid crystal panel base material according to the second embodiment.
Figure 7:
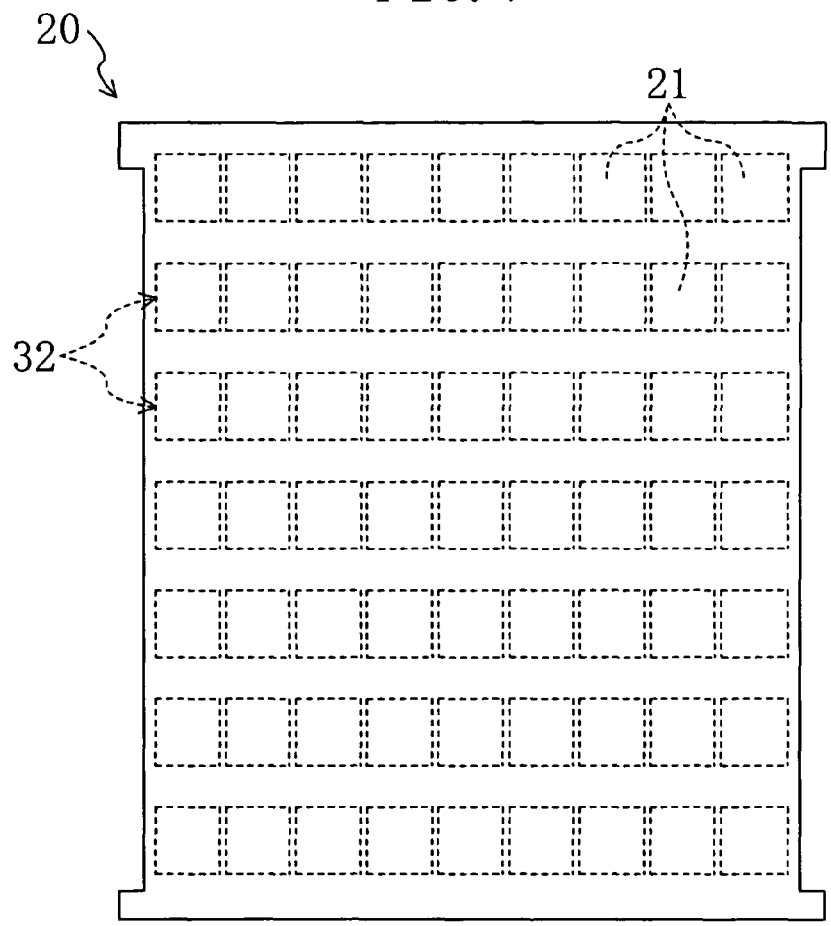
FIG. 7 is a diagram showing a second substrate of the liquid crystal panel base material according to the second embodiment.

FIGS. 5 through 7 show a liquid crystal panel base material A according to a second embodiment of the invention. Note that, in the embodiments described below, the same portions as those in FIGS. 1 through 4 are denoted by the same reference numerals and detailed description thereof will be omitted. FIG. 5 is a front view of the liquid crystal panel base material A according to this embodiment. FIG. 6 is a diagram showing a first substrate 10 of the liquid crystal panel base material A according to this embodiment. FIG. 7 is a diagram showing a second substrate 20 of the liquid crystal panel base material A according to this embodiment.

In the first embodiment, the TFT terminal portions 12 are exposed through the openings 22 formed in the second substrate 20. In this embodiment, on the other hand, TFT terminal portions 12 are extended from first electrode layers 11 to a part of a peripheral region of the first substrate 10. The TFT terminal portions 12 are thus exposed from a peripheral region of the liquid crystal panel base material A.

First, the first substrate 10 and the second substrate 20 of the liquid crystal panel base material A according to this embodiment will be described.

The first substrate 10 has the TFT terminal portions 12 extended from the first electrode layers 11 to a part of the peripheral region of the first substrate 10. As shown in FIG. 6, the TFT terminal portions 12 included in a plurality of cells 30 arranged in a line in a left-right direction are electrically connected to each other and extended to a peripheral region on both right and left sides of the first substrate 10. The TFT terminal portions 12 extended from the cells 30 of each line are connected to each other in the peripheral region on the left and right sides.

As shown in FIG. 7, the second substrate 20 has a notch shape on its right and left sides in a peripheral region. In other words, the peripheral region of the second substrate 20 which faces the peripheral region of the first substrate 10 in which the TFT terminal portions 12 extended from the first electrode layers 11 are formed has a narrower width than that of the peripheral region of the first substrate 10 so that the peripheral region of the first substrate 10 is exposed when the first substrate 10 and the second substrate 20 are bonded to each other.

In the bonding step, the first substrate 10 and the second substrate 20 are bonded to each other with the TFT terminal portions 12 being exposed without being covered by the second substrate 20 in the peripheral region on the right and left sides of the first substrate 10. As shown in FIG. 5, in the liquid crystal panel base material A thus manufactured, the TFT terminal portions 12 extended to the peripheral region of the first substrate 10 is exposed from the peripheral region of the liquid crystal panel base material A without being covered by the second substrate 20.

Effects of Second Embodiment

According to the second embodiment, when the first substrate 10 and the second substrate 20 are bonded to each other, the TFT terminal portions 12 extended to the peripheral region on the right and left sides of the first substrate 10 can be exposed without being covered by the second substrate 20. As a result, liquid crystal molecules in a liquid crystal layer 15 can be oriented to a predetermined direction by applying a voltage to the exposed TFT terminals 12. The same effects as those of the first embodiment can therefore be obtained.

Other Embodiments

In the first embodiment, it is described that the second substrate 20 has openings 22 in the region facing the TFT terminal portions 12 and the TFT terminal portions 12 are exposed through the openings 22. In the second embodiment, it is described that the TFT terminal portions 12 are extended from the first electrode layers 11 to the peripheral region of the first substrate 10 and the TFT terminal portions 12 are exposed from the peripheral region of the liquid crystal panel base material A without being covered by the second substrate 20. However, the invention is not limited to these structures. Any structure may be used as long as the TFT terminal portions 12 is exposed from the liquid crystal panel base material A so that a voltage can be applied to the TFT terminal portions 12 when the first substrate 10 and the second substrate 20 are bonded to each other.

In the above embodiments, it is described that an additive is a UV-polymerizable resin material that is polymerized and altered by UV irradiation. However, the embodiments of the invention are not limited to this. A photopolymerizable resin material that is altered by irradiation of light energy such as visible light and gives a pretilt angle to liquid crystal molecules may be used as an additive. Alternatively, a thermally polymerizable resin material that is altered by heating and gives a pretilt angle to liquid crystal molecules may be used as an additive. In other words, any material may be used as an additive as long as the material is altered under predetermined conditions to give a pretilt angle to liquid crystal molecules.

In the above embodiments, it is described as an example that the curing step is performed by emitting UV rays to the bonded substrate. However, the invention is not limited to this.

For example, the sealant 16 may be made of a thermosetting resin and a thermally polymerizable resin material for giving a pretilt angle to liquid crystal molecules may be included in the liquid crystal layer 15 so that the sealant 16 can be cured as well as the thermally polymerizable resin material in the liquid crystal layer 15 can be polymerized and altered by heating the bonded substrate. In other words, any material may be used as long as curing of the sealant 16 and alteration of the additive for giving a pretilt angle to liquid crystal molecules in the liquid crystal layer 15 can be implemented under the same conditions.

INDUSTRIAL APPLICABILITY

As has been described above, the invention is useful for a manufacturing method of a liquid crystal display device and a liquid crystal panel base material. The invention is especially suitable in the case where a liquid crystal display device in which liquid crystal molecules have an excellent pretilt angle in the whole liquid crystal layer is manufactured by using a liquid crystal dropping process.

The invention claimed is:

1. A method for manufacturing a plurality of liquid crystal display devices integrally arranged in a matrix pattern, each of the plurality of liquid crystal display devices in the matrix pattern including an approximately frame-shaped sealant sealing a liquid crystal layer between a first substrate and a second substrate facing the first substrate, comprising the steps of:
   providing a plurality of electrode layers on one face of the first substrate corresponding to the matrix pattern for controlling orientation of liquid crystal molecules in the liquid crystal layer of each of the plurality of liquid crystal display devices in the matrix pattern;
   providing a plurality of terminal portions on the one face of first substrate corresponding to and connected to at least one of the electrode layers;
   providing the second substrate;
   supplying the sealant in an uncured state to one of the one face of the first substrate and one face of the second substrate facing the one face of the first substrate to form the plurality of approximately frame-shaped sealant in the matrix pattern;
   dropping a liquid mixture of a liquid crystal material and an additive to a region inside each of the frame-shaped sealant in the uncured state;
   bringing the first substrate and the second substrate together with exposing at least one of the plurality of terminal portions so that each frame-shaped sealant in the uncured state is in contact with each substrate and surrounds the liquid mixture interposed therebetween to form a bonded substrate; and
   subjecting the bonded substrate to predetermined curing conditions to cure the sealant with a pretilt orienting voltage being applied to each of the terminal portions to alter the additive to give a pretilt angle to the liquid crystal molecules in each of the plurality of liquid crystal display devices in the matrix pattern,
   wherein the second substrate has at least one opening portion there through surrounded by the material of the second substrate, and the at least one of the plurality of terminal portions is exposed at the opening portion.

2. The method for manufacturing a plurality of liquid crystal display devices according to claim 1, wherein the pretilt orienting voltage is applied to the at least one of the plurality of terminal portions through the opening portion.

3. A method for manufacturing a plurality of liquid crystal display devices integrally arranged in a matrix pattern, each of the plurality of liquid crystal display devices in the matrix pattern including an approximately frame-shaped sealant sealing a liquid crystal layer between a first substrate and a second substrate facing the first substrate, comprising the steps of:
   providing a plurality of electrode layers on one face of the first substrate corresponding to the matrix pattern for controlling orientation of liquid crystal molecules in the liquid crystal layer of each of the plurality of liquid crystal display devices in the matrix pattern;
   providing a plurality of terminal portions on the one face of first substrate corresponding to and connected to at least one of the electrode layers;
   providing the second substrate which has a smaller area than the first substrate;
   supplying the sealant in an uncured state to one of the one face of the first substrate and one face of the second substrate facing the one face of the first substrate to form the plurality of approximately frame-shaped sealant in the matrix pattern;

dropping a liquid mixture of a liquid crystal material and an additive to a region inside each of the frame-shaped sealant in the uncured state;

bringing the first substrate and the second substrate together with exposing at least one of the plurality of terminal portions so that each frame-shaped sealant in the uncured state is in contact with each substrate and surrounds the liquid mixture interposed therebetween to form a bonded substrate; and subjecting the bonded substrate to predetermined curing conditions to cure the sealant with a pretilt orienting voltage being applied to each of the terminal portions to alter the additive to give a pretilt angle to the liquid crystal molecules in each of the plurality of liquid crystal display devices in the matrix pattern, wherein the second substrate has at least one cutout portion, and the at least one of the plurality of terminal portions is exposed at the cutout portion.

4. The method for manufacturing a plurality of liquid crystal display devices according to claim 3, wherein the pretilt orienting voltage is applied to the at least one of the plurality of terminal portions through the cutout portion.

* * * * *